United States Patent

Kiviranna

[15] 3,659,189

[45] Apr. 25, 1972

[54] REGULATED POWER SUPPLY LEAD-DROP COMPENSATION

[72] Inventor: John Kiviranna, Flushing, N.Y.

[73] Assignee: Forbro Design Corp., New York, N.Y.

[22] Filed: Feb. 3, 1971

[21] Appl. No.: 112,204

[52] U.S. Cl............................323/9, 323/22 T, 323/40
[51] Int. Cl.................................G05f 1/56, G05f 1/58
[58] Field of Search.....................323/1, 4, 9, 16, 19, 22 T, 323/40

[56] References Cited

UNITED STATES PATENTS 3,138,752  6/1964  DeBlasio..............................323/22 T
3,577,064  5/1971  Nercessian..........................323/22 T

*Primary Examiner*—A. D. Pellinen
*Attorney*—Alfred W. Barber

[57] ABSTRACT

An operational power supply is connected to supply the voltage drop in the common lead from the main regulated power supply to the load.

Regulated power supplies are designed to regulate their terminal voltage to a high degree. Where a remote load is being supplied, the voltage drop in the connecting leads may cause trouble as, for example, degraded voltage regulation across the actual load. This problem has been solved in some cases by providing remote voltage sensing leads feeding back the actual load voltage over leads separate from the load current carrying leads. However, there are practical limits imposed on this remote sensing method.

The voltage drop in the common lead to the load must be substantially less than the pass transistor drive amplifier output since the voltage drop in the common lead is in series and in opposition to this output. Also, if current limiting is accomplished by using the voltage drop across a current sensing resistor in series with the common lead and the reference voltage for the current limiting circuit is derived from the voltage reference, the voltage drop in the common lead acts in series with the voltage across the current sensing resistor causing current limiting to take place at a lower actual load current than provided for.

8 Claims, 4 Drawing Figures

Patented April 25, 1972
3,659,189
3 Sheets-Sheet 1
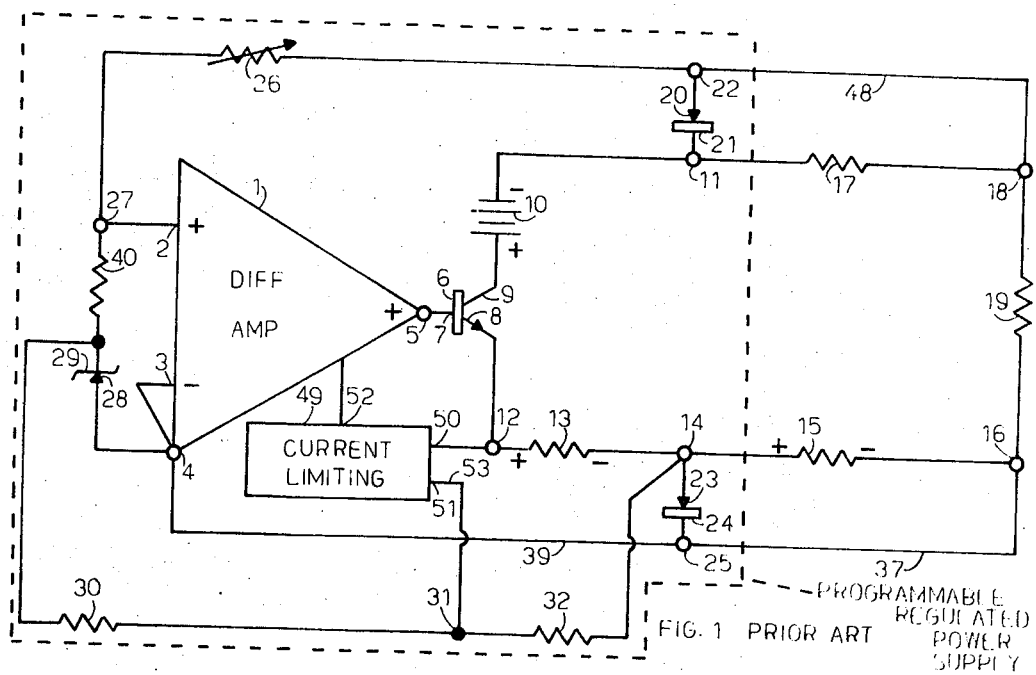
FIG. 1 PRIOR ART PROGRAMMABLE REGULATED POWER SUPPLY
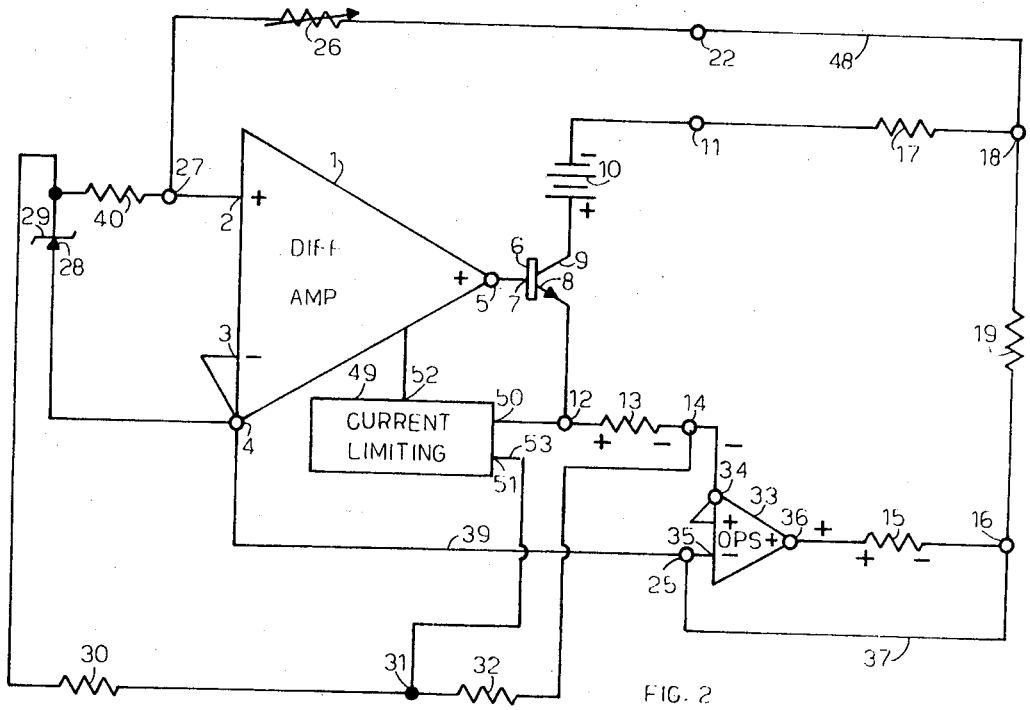
FIG. 2
INVENTOR.
JOHN KIVIRANNA
BY
Alfred W. Barber
ATTORNEY

REGULATED POWER SUPPLY LEAD-DROP COMPENSATION

SUMMARY

An operational power supply, i.e. a regulated power supply capable of providing substantial amounts of output power and meeting the input/output, gain, stability and other criterea of an operational amplifier, is connected in series with the common output lead of a regulated power supply connected to a remotely located load. The remote error sensing lead is connected from one end of the load to the inverting input of the operational power supply. The operational power supply acts to maintain the voltage across its input at a null or close to zero voltage and hence automatically supplies a voltage equal and opposite to the lead drop in series with the remote lead. The voltage across the current sensing resistor is no longer disturbed by the remote lead voltage drop and the pass transistor driving amplifier no longer has to provide an output dependent on the lead drop. The requirement for the operational power supply is that it be capable of supplying the load current at an output voltage somewhat greater than the maximum expected remote load lead voltage drop.

Modifications of the basic system described in general above includes a mode of connection in which the remote lead drop is compensated by an operational power supply located at the load location. Another modification provides a lead compensating operational power supply for both remote leads and thereby reducing the output voltage requirement of the main regulated power supply.

A circuit providing current limiting of a regulated power supply with the current reference derived from the voltage reference is shown in U.S. Pat. No. 3,373,342. In the Drawing:

FIG. 1 is a simplified schematic circuit diagram of a prior art power supply to which the present invention pertains.

FIG. 2 is a simplified schematic circuit diagram of the preferred form of the present invention.

Figure 3:
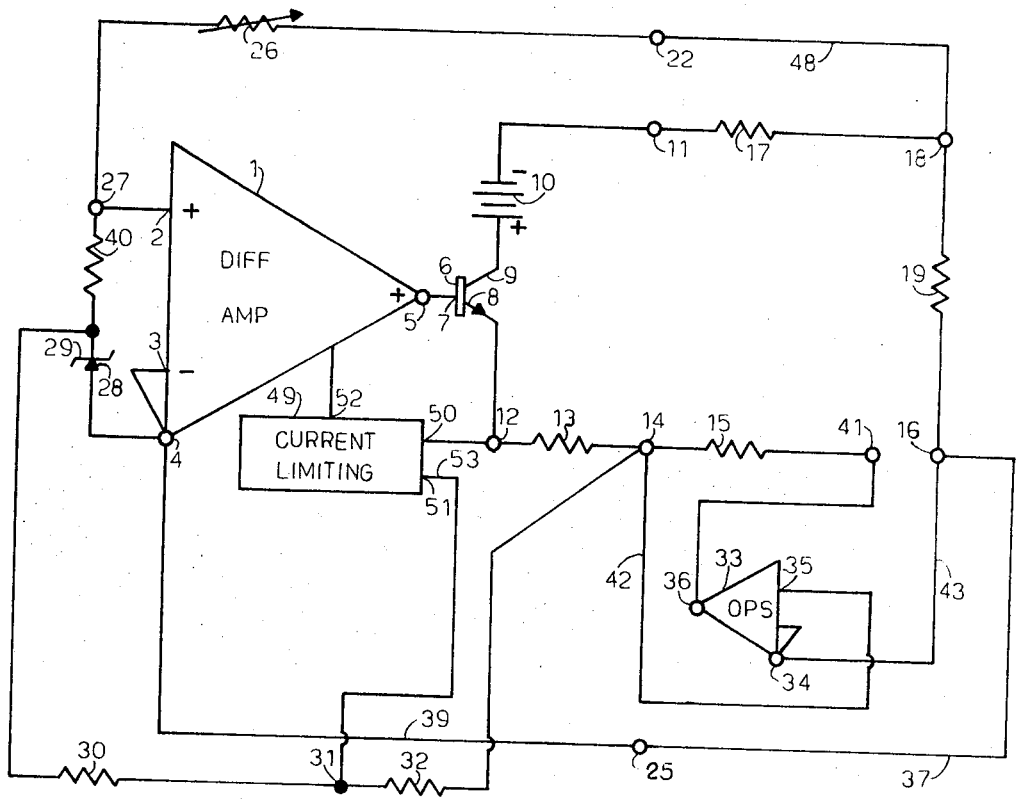
FIG. 3 is a simplified schematic circuit diagram of a modified form of the present invention.

FIG. 1 showing the prior art on which the present invention is based includes a programmable regulated power supply following the precepts set forth in U.S. Pat. No. 3,028,538. Such a power supply is represented by all the components within the dotted line enclosure. Typical of such power supplies is the Kepco Model JQE 55-2M as manufactured by Kepco, Inc., Flushing, New York. A differential amplifier 1 having a non-inverting input 2, an inverting input 3 connected to common 4 and an output 5 is connected in a feedback circuit and drives pass transistor 6. The pass transistor 6 includes a base 7, an emitter 8 and a collector 9. The output terminal 5 of amplifier 1 is connected in driving relationship to pass transistor 6 by being connected to base 7. A source of potential to be regulated 10 is connected between collector 9 and a terminal 11, and emitter 8 is connected to terminal 12, these latter two terminals to be further described below. A load 19 is to be supplied with regulated voltage is connected between load terminals 16 and 18. Terminals 16 and 18 are connected to terminals 14 and 11 respectively by means of long leads represented by equivalent resistances 15 and 17 respectively. Terminal 14 is connected to terminal 12 by means of current sensing resistor 13. Terminal 16 is connected to terminal 25 by means of lead 37, called a remote sensing lead, and terminal 25 is connected to common terminal 4 of the amplifier 1 by means of lead 39. Feedback from load terminal 18 is taken over remote sensing lead 48 to terminal 22 and through output voltage control resistor 26 to null junction 27 which in turn is connected to non-inverting input terminal 2. A source of reference voltage represented by zener diode 28–29 is connected to common terminal 4 on one side and through reference resistor 40 to null junction 27. Terminals 22 and 25 may be termed remote sensing terminals since they are connected to the amplifier feedback control circuitry and if connected to the load terminals 18 and 16 over leads 48 and 37 which do not carry any load current, the system operates to regulate the voltage at the load terminals in spite of possible fluctuating voltage drops in the load current carrying leads as represented by resistors 15 and 17. Diodes 28–21 and 23–24 may be connected as shown to prevent the power supply from running out of control due to an open error sensing lead 37 or 48.

The current limiting circuit typically compares the load current generated voltage drop across current sensing resistor 13 with a reference voltage and when the current drop exceeds the reference voltage, inhibits or cuts off the amplifier preventing further drive of current into the load. The current limiting device 49 may be taken to represent a comparator device having inputs 50 and 51 for receiving the drop across the current sensing resistor and the reference voltage respectively and an output 52 which is adapted to inhibit amplifier 1 when the voltage across the current sensing resistor exceeds the reference voltage. The reference voltage is supplied from the reference voltage across zener diode 29–28 divided to an appropriate reference voltage at junction 31, connected over lead 53 to input 51, by suitable voltage divider resistors 30 and 32 returned to common terminal 14. If desired the current limiting may be made adjustable by making resistor 32 variable.

The above described circuit is satisfactory for many applications but has limitations. These limitations become evident when the drop in the remote leads 15 and 17 becomes appreciable. For example, if the drops in these leads exceeds the forward conduction voltage of diodes 20–21 and 23–24, these diodes will carry load current and if not burned out will at least upset the voltage on the remote sensing terminals 22 and 25. More important, however, is the effect the drop in the common side load carrying lead 15 since it upsets the current limiting circuit operation. Since the drop in lead 15 is in series with resistor 32 in the return path to amplifier common terminal 4, any voltage drop in this lead affects the reference voltage at terminal 51. It is in such a direction as to effectively reduce the reference voltage causing current limiting to take place at a lower current than anticipated. In fact if the drop in lead 15 is great enough, the reference voltage may be effectively cancelled blocking amplifier 1 at a low current.

FIG. 2 is a schematic circuit diagram showing the preferred form of the present invention as applied to the prior art regulated power supply of FIG. 1. Corresponding components carry the same numerical designations. In accordance with the present invention an operational power supply 33 is connected in such a manner as to effectively buck-out the load current drop in common side remote lead 15. Operational power supply 33 includes an inverting input terminal 35, a common terminal 34 and an output terminal 36. Common terminal 34 is connected to output terminal 14 and lead 15 is connected between output terminal 36 and load terminal 16. Inverting input terminal 35 is connected to remote sensing terminal 25. It will be seen that the remote sensing circuit over leads 37 and 39 is undisturbed and serves as before to convey the actual load terminal voltage to the amplifier circuit. However, the load current now passes through operational power supply 33. It is well known that one of the characteristics of an operational amplifier or operational power supply is that they operate to produce a null across their input. Thus, terminal 35 and hence terminal 25 will be held at the same potential as common terminal 34 and hence load terminal 14 plus or minus a very small off-set or driving voltage delta (depending in magnitude on off-set corrections and the gain of the amplifier or power supply). What actually takes place is that power supply 33 provides a voltage substantially equal to the voltage in lead 15 and of opposite polarity effectively bucking out this remote lead voltage drop. With the potential of terminal 14 substantially the same as the potential of common terminal 4, the upsetting effects of the remote lead voltage drop are effectively eliminated. The operational power supply is effectively in series with the main power supply and is programmed automatically by the voltage drop in the load lead to an equal value of opposite polarity thus cancelling the load lead voltage drop and delivering full output voltage to the load.

FIG. 3 is similar in every way to FIG. 2 except that operational power supply 33 is connected at the load end of the common lead 15. Thus, FIG. 2 may represent a set-up where the lead drop compensating operational power supply 33 is physically located near the main power supply while FIG. 3 may represent a set-up where the lead drop compensating operational power supply 33 is physically located near the load. In FIG. 3 operational power supply 33 is connected between common lead 15 and load terminal 16. The end of lead 15 at 41 is disconnected from load terminal 16 and connected instead to output terminal 36 of operational power supply 33, common terminal 34 is connected by lead 43 to load terminal 16 and inverting input terminal 35 is connected over lead 42 to terminal 14. The mode of operation is the same as described above in connection with FIG. 2 except that the point at which the lead compensating voltage supplied by operational power supply 33 is inserted in series with lead 15 at the load end rather than at the main power supply end.

Figure 4:
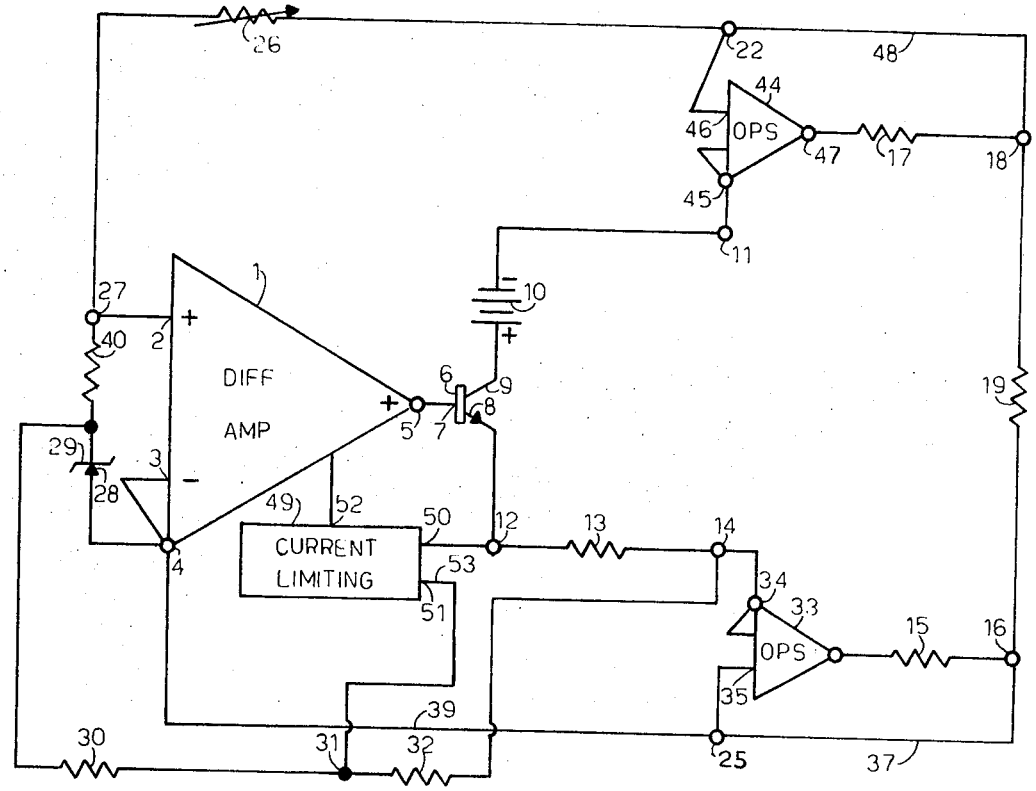
FIG. 4 is a simplified schematic circuit diagram of a further modification of the present invention.

FIG. 4 is similar in every way to FIG. 2 except that a second operational power supply 44 is inserted in series with the high-side lead 17 between terminal 11 and lead 17. Operational power supply 44 has a common terminal 45, an inverting input terminal 46 and an output terminal 47. Common terminal 45 is connected to the main power supply output terminal 11; output terminal 47 is connected to lead 17 and inverting input terminal 46 is connected to remote sensing terminal 22. As described above in connection with FIG. 2, the result is that operational power supply 44 regulates to produce a null between its terminals 45 and 46 and hence terminals 11 and 22 will be at substantially the same potential. This is accomplished since operational power supply 44 automatically provides a voltage between terminals 11 and 47 which is equal and opposite to the voltage drop in lead 17. This circuit of FIG. 4 is particularly useful where the remote load produces a large voltage drop in leads 15 and 17 so that the main power supply may not be able to provide the required voltage at the load. It will be apparent that the circuit of FIG. 4 can be modified as shown in FIG. 3 so that one or both of the operational power supplies 33 and 44 can be located physically near the remote load.

The operational power supplies which may typically be used to carry out the present invention are, for example, main power supply 1 may be a Kepco Model JQE 55-2 while a compatible compensating supply 33 may be a Kepco Model ABC 7.5-2M and compensating supply 44 may be a Kepco Model OPS 7-2B. Another combination may be main power supply 1, a Kepco Model JQE 100-1 and compensating supply 33, a Kepco Model PAX 7-1.

I claim:
1. In a regulated power supply system, the combination of;
a regulated power supply including a pair of output terminals, a feedback terminal and a common terminal;
a two terminal load to be supplied with power from said output terminals;
a first circuit means connected from the first of said output terminals to the first of said load terminals;
an operational power supply including an inverting input terminal, a common terminal and an output terminal;
a connection between the second of said power supply output terminals and said operational power supply common terminal;
a second circuit means connected from said output terminal of said operational power supply to the second of said load terminals;
a lead connected between the said second load terminal, the inverting input terminal of said operational power supply and the regulated power supply common terminal;
and a feedback circuit connected from said first load terminal to said feedback terminal;
whereby said second power supply output terminal and said second load terminal are maintained at substantially the same potential in the presence of a load current voltage drop in said second circuit means.
2. A regulated power supply system as set forth in claim 1;
wherein said first circuit means includes an operational power supply connected to maintain said first output terminal at substantially the same potential as the first of said load terminals.
3. A regulated power supply system as set forth in claim 1;
wherein said feedback circuit comprises an adjustable output voltage control resistor.
4. A regulated power supply system as set forth in claim 1;
wherein said first and second circuit means comprise electrical conductors of substantial length and resistive impedance.
5. A regulated power supply system as set forth in claim 1;
wherein said load is remotely located with respect to said regulated power supply.
6. A regulated power supply system as set forth in claim 1;
and including current limiting circuit means connected to said regulated power supply.
7. A regulated power supply system as set forth in claim 1;
wherein said load is remotely located with respect to said regulated power supply and said operational power supply is located adjacent to said regulated power supply.
8. A regulated power supply system as set forth in claim 1;
9. In a regulated power supply system, the combination of:
a regulated power supply including a pair of output terminals, a feedback terminal and a common terminal;
a two terminal load to be supplied with power from said output terminals;
a first circuit means connected from the first of said output terminals to the first of said load terminals;
an operational power supply including an inverting input terminal, a common terminal and an output terminal;
a second circuit means connected between the second of said power supply output terminals and said operational power supply output terminal;
a connection from said common terminal of said operational power supply to the second of said load terminals;
a lead connected between the second load terminal and the regulated power supply common terminal;
a connection between said second output terminal of said power supply and said inverting input terminal of said operational power supply;
and a feedback circuit connected from said first load terminal to said feedback terminal;
whereby said second power supply output terminal and said second load terminal are maintained at substantially the same potential in the presence of a load current voltage drop in said second circuit means.

* * * * *